Patented Nov. 25, 1952

2,619,488

UNITED STATES PATENT OFFICE 2,619,488

METHOD OF PREPARING d,l-DIHYDRO-LYSERGIC ACID

Arthur Stoll and Jürg Rutschmann, Basel, Switzerland, assignors to Sandoz A. G., Basel, Switzerland, a Swiss firm No Drawing. Application January 16, 1951, Serial No. 206,318. In Switzerland January 30, 1950

3 Claims. (Cl. 260—285.5)

The present invention relates to certain racemic isomeric dihydro-lysergic acids, namely, d,l-dihydro-lysergic acid and d,l-dihydro-isolysergic acid I, and to the preparation thereof from the methyl esters of the corresponding d,l-dihydro-norlysergic acids.

The d,l-dihydro-nor-lysergic acids correspond to the formula

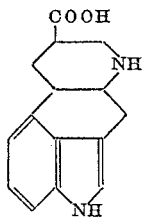

They may be regarded as piperidine derivatives containing a secondary nitrogen (see, e. g., the nitrogen atom in the 6-position).

The said dihydro-nor-lysergic acids may be prepared by the action of reducing agents on compounds corresponding to the type formula:

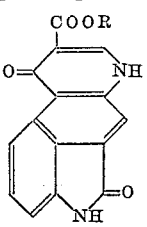

wherein R represents an alkyl group, such as methyl, ethyl, etc., whereby on the one hand the γ-pyridone ring system (ring D) of the starting material is reduced to the piperidine system and, on the other hand, the lactam system of ring B and the double bond in ring C are reduced to the indole system (rings A and B), as is illustrated by the following scheme:

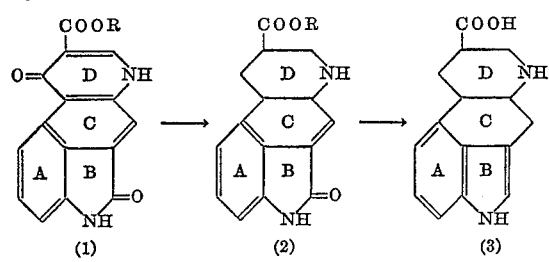

This procedure leads to the formation of isomeric racemic dihydro-nor-lysergic acid compounds which, in contrast to the starting material, give the blue Keller reaction which is typical of lysergic acid derivatives. By means of suitable methods, e. g. fractional crystallization or chromatography, the isomers may be separated and purified, whereby inter alia the following compounds may be obtained:

(a) d,l-dihydro-nor-lysergic acid ($C_{15}H_{16}O_2N_2$)
—leafets melting above 350° C.;
(b) d,l-dihydro-nor-isolysergic acid I ($C_{15}H_{16}O_2N_2$)

—thin prisms melting above 350°C.

In practicing the process, the starting compound of type (1), supra, preferably dissolved in a suitable solvent such as glacial acetic acid, is treated with a metal such as zinc amalgam and with an acid such as hydrochloric acid. The evolved hydrogen effects the reduction of the γ-pyridone ring system of the starting compound to a piperidine system. At the same time, hydrolysis of the ester group of ring D may take place, in which case subsequent reesterification can be performed, if desired.

The resultant product, type (2) supra, is then subjected to a second reduction which may, for example, be carried out by the Bouveault-Blanc method. For this purpose, the said resultant product, type (2), may be dissolved in an alcohol, such as n-butanol or n-amyl alcohol, containing a trace of water, and the solution treated with an alkali metal, preferably sodium, heating if necessary. The reduction is, in this case, always accompanied by hydrolysis of the ester group of ring D, so that a mixture of isomeric, racemic dihydro-nor-lysergic acids (Formula 3 supra) is obtained. This mixture may be separated into its components, as hereinbefore enumerated, by means of suitable methods, such as fractional crystallization or chromatographic analysis. Conventional esterification with methanol produces the corresponding methyl esters which are the starting materials according to the present invention.

It is well-known that difficulties are experienced in alkylating piperidine derivatives with a secondary nitrogen atom to produce the corresponding tertiary bases. Many of the simpler compounds of this series can be methylated to the tertiary bases by means of formaldehyde and formic acid, but this reaction usually fails in the case of compounds of more complicated structure. In these cases, it is necessary to resort to methylation by means of alkyl halides or alkyl sulphates. As a rule however, this method yields mainly or entirely the quaternary ammonium salts.

A primary object of the present invention is the embodiment of a process whereby the methylation of the secondary nitrogen atom of the piperidine ring of d,l-dihydro-nor-lysergic acid or of the secondary nitrogen atom of the piperidine ring of d,l-dihydro-nor-isolysergic acid I may be accomplished in a simple manner.

This object is realized according to the present invention, briefly stated, by subjecting the d,l-dihydro-nor-lysergic acid methyl ester or the d,l-dihydro-nor-isolysergic acid I methyl ester to simple heating to a high temperature, for example 200 to 240° C. Such heating according to this invention brings about the migration of the ester methyl group to the nitrogen atom of the piperidine ring D. Thus, for example, if d,l-dihydro-nor-lysergic acid methyl ester (i) is heated to a high temperature, as aforeindicated, a rearrangment takes place, the methyl group migrating from the carboxyl group at position 8 to the nitrogen atom of the piperidine ring D, with the formation of d,l-dihydrolysergic acid (ii).

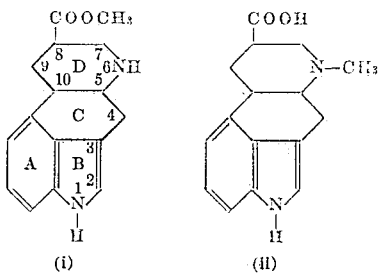

The new d,l-dihydro-lysergic acid and d,l-dihydro-isolysergic acid I are useful intermediates, inter alia for the manufacture of valuable therapeutic compounds.

The following examples exemplify the invention in greater detail. Parts are by weight. Temperatures are in degree centigrade.

*Example 1*

300 parts of d,l-dihydro-nor-lysergic acid methyl ester are heated to 210° C. in a sealed, evacuated glass tube. The temperature is raised to 230° in the course of 30 minutes and the tube then allowed to cool. The solidified product is taken up in dilute aqueous ammonia and the solution extracted with chloroform in order to remove the non-acid constituents. The aqueous ammoniacal solution is then concentrated cautiously until abundant crystallization takes place. After allowing the mass to stand for a short time, the d,l-dihydro-lysergic acid is filtered off and recrystallized from water. The product is obtained in the form of polygonal leaflets which decompose at approximately 300° C. without actually melting. The yield is about 200 parts.

The methyl ester may be prepared from the acid in the conventional way by treatment with methyl alcoholic hydrochloric acid, and crystallizes from benzene in large plates which, on standing, become transformed into spindleshaped crystals which, recrystallized from ethyl acetate and dried at 75° C. under high vacuum, melt at 148–150° (corr.).

*Example 2*

400 parts of d,l-dihydro-nor-isolysergic acid I methyl ester are sealed in an evacuated glass tube and heated for 30 minutes at 200–210° C. After cooling, the content of the tube consists of d,l-dihydro-isolysergic acid I.

This acid may be esterified in the conventional manner with methyl alcoholic hydrochloric acid. The crude ester may then be dissolved in benzene and the solution passed through a column containing 2500 parts of aluminum oxide, the issuing fluid being collected in a series of fractions. On evaporation of the first fractions an oily residue is obtained which crystallizes easily on rubbing with a little methanol. In this way about 80 parts of d,l-dihydro-isolysergic acid I methyl ester are obtained. After recrystallizing from methanol and drying at 75° under high vacuum the product melts at 155–157°.

Having thus disclosed the invention, what is claimed is:

1. A process for the manufacture of a member selected from the group consisting of d,l-dihydrolysergic acid and the isomeric d,l-dihydro-isolysergic acid I, comprising the step of heating the corresponding member selected from the group consisting of the methyl esters of d,l-dihydro-nor-lysergic acid and d,l-dihydro-nor-isolysergic acid I to a temperature of 200–240° C.

2. A process for the manufacture of d,l-dihydrolysergic acid comprising the step of heating the d,l-dihydro-nor-lysergic acid methyl ester to a temperature of 200–240° C.

3. A process for the manufacture of d,l-dihydro-isolysergic acid I, comprising the step of heating the d,l-dihydro-nor-isolysergic acid I methyl ester to a temperature of 200–240° C.

ARTHUR STOLL.
JÜRG RUTSCHMANN.

REFERENCES CITED

The following references are of record in the file of this patent:

FOREIGN PATENTS

| Number | Country | Date |
|---|---|---|
| 256,847 | Switzerland | Mar. 16, 1949 |

OTHER REFERENCES

Uhle et al.: J. Org. Chem., vol. 10, pp. 76–86 (1945).

Stoll et al.: Helv. Chem. Acta., vol. 32, pp. 506–521 (1949).